United States Patent

Tokairin et al.

[11] Patent Number: 6,054,070
[45] Date of Patent: Apr. 25, 2000

[54] METHOD OF MANUFACTURING A SELF-SUPPORT OPTICAL CABLE

[75] Inventors: Noboru Tokairin; Masahiro Eguchi; Shigeru Suemori, all of Yokohama, Japan

[73] Assignee: Sumitomo Electric Industries Inc., Osaka, Japan

[21] Appl. No.: 09/016,407

[22] Filed: Jan. 30, 1998

[30] Foreign Application Priority Data

Jan. 30, 1997 [JP] Japan .................................... 9-016664
Dec. 8, 1997 [JP] Japan .................................... 9-337086

[51] Int. Cl.⁷ .................................................. B29D 11/00
[52] U.S. Cl. .......................................... 264/1.28; 264/1.29
[58] Field of Search ........................... 264/1.1, 1.28, 264/1.29

[56] References Cited

U.S. PATENT DOCUMENTS

| | | | |
|---|---|---|---|
| 4,585,406 | 4/1986 | Ravela | 264/1.29 |
| 4,814,116 | 3/1989 | Oestreich et al. | 264/1.28 |
| 4,861,525 | 8/1989 | Oestreich | 264/1.29 |
| 4,893,998 | 1/1990 | Schlaeppi et al. | 264/1.29 |
| 5,015,063 | 5/1991 | Panuska et al. | 264/1.28 |
| 5,372,757 | 12/1994 | Schneider | 264/1.28 |

FOREIGN PATENT DOCUMENTS

| | | |
|---|---|---|
| 62-81913 | 5/1987 | Japan . |
| 2-156213 | 6/1990 | Japan . |
| 7-230028 | 8/1995 | Japan . |
| 8-75969 | 3/1996 | Japan . |

*Primary Examiner*—Mathieu D. Vargot
*Attorney, Agent, or Firm*—Pillsbury Madison & Sutro LLP

[57] ABSTRACT

In a method of manufacturing a self-support optical cable, a support wire and an optical cable body arranged in parallel are fed with each other; a sheath into an eight figure shape is extruded by an extruder to collectively coat the outer circumferences of the support wire and the optical cable body with the sheath, and thereafter, the self-support optical cable is cooled before hardening while the cable passes through a plurality of guide wheels so that an excess length is given to the optical cable body. In this method, the guide wheels are disposed in a cooling water tank in a manner so that a guide wheel contacting with one side of the self-support optical cable with the sheath in a softened state and another guide wheel contacting with the other side of the self-support optical cable with the sheath in a softened state are disposed alternately in the feed-out direction, said excess length is controlled based on the tension of the support wire, or the tension of said optical cable body at an inlet portion of said extruder is reduced by a tension reducing device.

13 Claims, 11 Drawing Sheets

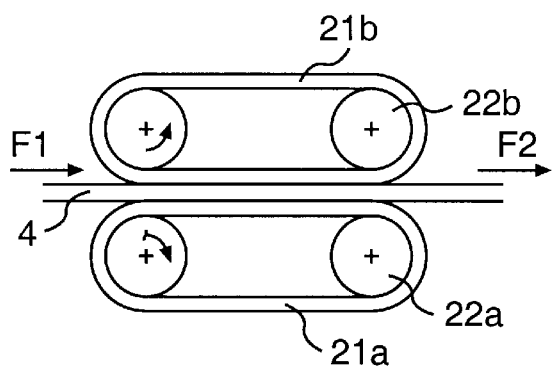
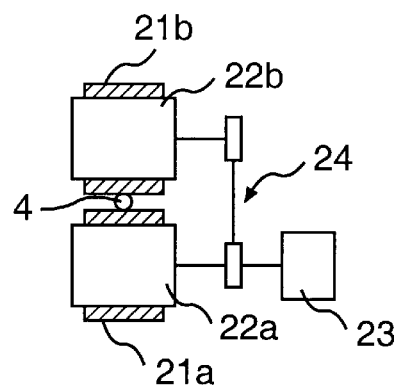
FIG. 8A  FIG. 8B
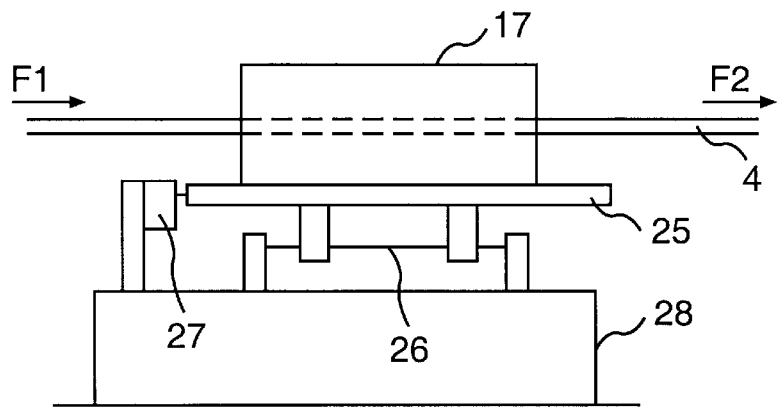
FIG. 9
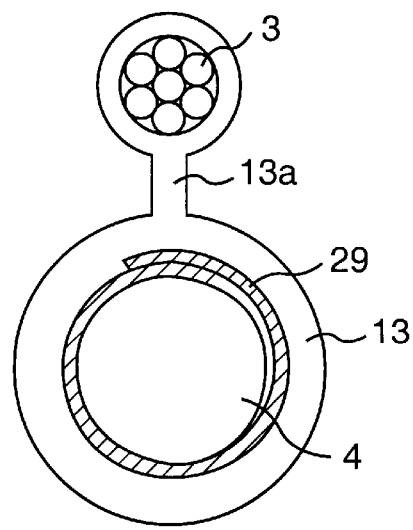
FIG. 10

FIG. 13
PRIOR ART
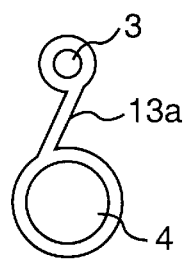
FIG. 14A
PRIOR ART
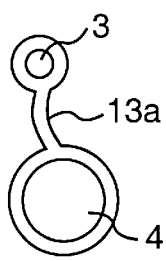
FIG. 14B
PRIOR ART
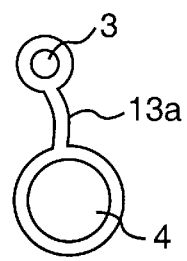
FIG. 14C
PRIOR ART
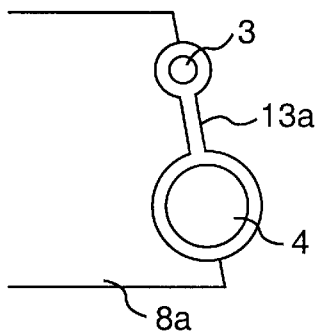
FIG. 15A
PRIOR ART
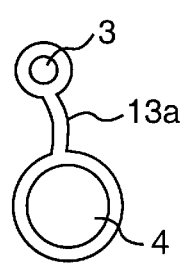
FIG. 15B
PRIOR ART
FIG. 15C
PRIOR ART

METHOD OF MANUFACTURING A SELF-SUPPORT OPTICAL CABLE

BACKGROUND OF THE INVENTION

1. Field of the Invention

The present invention relates to a method of manufacturing a self-support optical cable having superior appearance and a predetermined stable excess length.

2. Description of the Related Art

Conventionally, in a self-support optical cable, a support wire and an optical cable body have been integrated with each other. When such a cable is strung aerially, the opposite ends of the support wire are fixed to poles to hold the optical cable body portion. This cable has an advantage of good workability such that it is not necessary to string the support wire independently and the working of stringing can be finished at a time because the support wire and the optical cable body are integrated with each other. In the state where the self-support optical cable has been strung, however, the tension given to the support wire reaches several hundred kgf, and its extension percentage reaches about 0.2%. If such an extension of about 0.2% is always given to an optical fiber, a serious problem for durability is a matter of concern from the viewpoint of a long-time reliability.

A self-support optical cable which can solve this problem is shown in FIGS. 12 and 13. In FIGS. 12 and 13, the reference numeral 3 represents a support wire; 4, an optical cable body; 13, a common sheath; 13a, a neck portion; and 13b, a slit. In this self-support optical cable, the support wire 3 and the optical cable body 4 are coated with the common sheath 13 integrally. Normally, the outer diameter of the optical fiber body 4 is larger than the outer diameter of the support wire 3. Therefore, the common sheath 13 is formed into an eight figure shape (otherwise referred to as a figure eight shape). The slit 13b is formed intermittently in the neck portion 13a of this eight figure sheath. In FIG. 12, the self-support optical cable is strung and extended by tension given to the support wire 3 so that the optical cable body 4 is arranged in parallel with the support wire 3. In the case where no tension is given to the support wire 3, the optical cable body 4 has an excess length relative to the support wire 3, so that the optical cable body 4 is meandering when viewed from below as shown in FIG. 13.

A method of manufacturing such a self-support optical cable provided with an eight figure sheath is disclosed in Unexamined Japanese Patent Publication (kokai) No. Hei-7-230028. The manufacturing method disclosed in this publication is a method comprising the step of extruding a common sheath of a support wire and an optical cable body into an eight figure shape simultaneously, and the step of cooling the self-support optical cable with the softened common sheath while winding the self-support optical cable around a capstan, immediately after extruding. The outer circumferential surface of the capstan is cylindrical, and straight in parallel with its central axis. Since the self-support optical cable is wound on the cylindrical surface, there arises a difference between the circumference of the central axis of the support wire and the circumference of the central axis of the optical cable body so that an excess length of the optical cable body is obtained by this difference.

In addition, Unexamined Japanese Patent Publication (kokai) No. Hei-8-75969 discloses a similar manufacturing method using a grooved capstan. In this grooved capstan, a groove into which a support wire and an optical cable body can be inserted is formed in the outer circumferential surface of the capstan.

In such a conventional technique, a self-support optical cable with a softened common sheath was wound around a single capstan by one or several turns in the same direction. Accordingly, there was a problem in the cooled self-support optical cable that a bending might arise in a neck portion, so that a stable excess length could not be formed and the appearance became poor.

That is, in the manufacturing method disclosed in Unexamined Japanese Patent Publication (kokai) No. Hei-7-230028, the self-support optical cable with the softened common sheath is wound around the straight outer circumferential surface of the capstan and contacts therewith. Accordingly, as shown in FIGS. 14A, 14B and 14C, the shape of the neck portion 13a of the common sheath 13 is not only inconsistent but also shaped variously. In the manufacturing method disclosed in Unexamined Japanese Patent Publication (kokai) No. Hei-8-75969, as shown in FIG. 15A, the grooved capstan 6 is used. Therefore, the shape of the neck portion 13a of the common sheath 13 is restricted to some extent, so that the neck portion 13a can be prevented from bending inward as shown in FIG. 15B. However, it is impossible to prevent the neck portion 13a from bending outward as shown in FIG. 15C.

In addition, the excess length of the optical cable body with respect to the support wire in the self-support optical cable is changed according to the cable outer diameter, the deformation of the cable, the deflection amount of the cable, the hardness of the optical cable body, the temperature of cooling water, the manufacture line velocity, and the like. However, in order to confirm the excess length of the optical cable body, the condition of the optical cable with respect to the expansion of the support should be observed by actually laying the self-support optical cable, or the finished self-support optical cable should be divided to the support wire and the optical cable body so as to measure respective lengths.

A method as described in Unexamined Japanese Utility Model Publication No. Sho-62-81913 or Unexamined Japanese Patent Publication (kokai) No. Hei-2-156213, in which a tension is added to a support wire to give expansion and a common sheath covers the support wire and an optical cable body to which expansion is not applied, has the following problem. In case of using a tension-resistance body for the supporting wire in which seven steel wires having diameter of 2 mm are stranded, in order to obtain 0.3% excess length of the optical fiber body, the excess length is calculated by the formula of: (excess length)={(section of tension-resistance body)×(Young's Modulus of tension-resistance body)}×100. Accordingly, it is calculated: 0.3%={1188 kg/($\pi$×(2.0 mm/2)$^2$×7×18000 kg/mm$^2$)}×100. Thus, the tension of 1200 kg is necessary in a manufacturing facility. Since the maximum tension of a normal manufacturing facility is about 500 kg, a strong facility should be needed and there is a safety problem.

In a method in which the excess length is obtained by winding the support wire and the optical cable body around a guide wheel, if the outer diameter of the optical cable body is changed, the excess length of the support wire is also changed. In order to set the variation of the excess length within a predetermined range, a plurality of guide wheel units should be prepared for the variation ranges of the outer diameter of the optical cable body. For example, if the target value of the outer diameter of the optical cable body is set to "D", when the variation amount of the outer diameter of the optical cable body is ±10%, that is, the outer diameter of the optical cable body is D±10%, the excess length can not be obtained in a predetermined length. Accordingly, the outer diameter of the optical cable body should be suppressed within the range of D±3%. If D is 15 mm and the outer diameter of the guide wheel is 1000 mm, the variation of the outer diameter should be suppressed so that the outer diameter of the optical cable body is within the range of 15±0.5 mm.

Furthermore, there is another problem that a desired excess length can not be obtained if the optical cable body slips on the guide wheel because of a large tension caused by a large supply drum of the optical cable body feeding machine. On the other hand, if the tension of the optical fiber cable body is large at the guide wheel, the sheath of the optical cable body may be flattened. Such flattening of the sheath causes various problems including a change in the winding diameter of the optical cable around the guide wheel, which results in a failure to obtain a predetermined excess length. If the tension of the optical cable body is changed, the expansion amount of the optical cable body itself is changed, thereby generating the deviation of the excess length.

In a method to manufacture the self-support optical cable in which a metal tape such as aluminum or stainless is attached longitudinally on the optical cable body, the metal tape is cyrindrially formed, and a common sheath is applied thereon, the tension generated by the formation when the metal tape is longitudinally attached to the optical cable body is applied to the optical cable body. Accordingly, the tension given to the optical cable body is very high, and the tension when passing through the guide wheel is also made large. Therefore, it is not possible to obtain a desirable excess length because of the same reason as described above.

SUMMARY OF THE INVENTION

Taking the foregoing situation into consideration, it is an object of the present invention to provide a method for producing a self-support optical cable having a predetermined stable excess length.

According to a first aspect of the present invention, a method of manufacturing a self-support optical cable comprises the steps of feeding a support wire and an optical cable body arranged in parallel with each other, extruding a sheath into an eight figure shape by means of an extruder so as to collectively coat the outer circumferences of said support wire and said optical cable body with said sheath, and thereafter cooling said self-support optical cable before hardening while said cable passes through a plurality of guide wheels so that an excess length is given to said optical cable body, wherein said guide wheels are disposed in a cooling water tank in a manner so that a guide wheel contacting with one side of said self-support optical cable with said sheath in a softened state and another guide wheel contacting with the other side of said self-support optical cable with said sheath in a softened state are disposed alternately in the feed-out direction.

According to a second aspect of the present invention, in the method of manufacturing a self-support optical cable according to the first aspect of the invention, the outer circumferential surface of each of said guide wheels is shaped into a straight cylinder, a tapered cylinder, or a stepped cylinder.

According to a third aspect of the present invention, in the method of manufacturing a self-support optical cable according to the first aspect of the invention, the outer circumferential surface of each of said guide wheels is shaped into a grooved or lug cylinder.

According to a fourth aspect of the present invention, in the method of manufacturing a self-support optical cable according to any one of first to third aspect of the invention, said guide wheels are disposed so that the product of the distance between the first contact point of said guide wheels and the outlet of said extruder and the excess length rate is 10 mm or less.

According to a fifth aspect of the present invention, a method of manufacturing a self-support optical cable comprises the steps of feeding a support wire and an optical cable body arranged in parallel with each other, extruding a sheath into an eight figure shape by means of an extruder so as to collectively coat the outer circumferences of said support wire and said optical cable body with said sheath, and thereafter cooling said self-support optical cable before hardening while said cable passes through a plurality of guide wheels so that an excess length is given to said optical cable body, wherein said excess length is controlled based on the tension of the support wire.

According to a sixth aspect of the present invention, in the method of manufacturing a self-support optical cable according to the fifth aspect, said excess length is continuously measured in the longitudinal direction of said cable, and the tension of the support wire is controlled based on the measurement result to control said excess length.

According to a seventh aspect of the present invention, in the method of manufacturing a self-support optical cable according to the sixth aspect of the invention, the measurement result is a measurement result of 5 m or more length portion of the excess length.

According to an eighth aspect of the present invention, a method of manufacturing a self-support optical cable comprises the steps of feeding a support wire and an optical cable body arranged in parallel with each other, extruding a sheath into an eight figure shape by means of an extruder so as to collectively coat the outer circumferences of said support wire and said optical cable body with said sheath, and thereafter cooling said self-support optical cable before hardening while said cable passes through a plurality of guide wheels so that an excess length is given to said optical cable body, wherein the tension of said optical cable body at an inlet portion of said extruder is reduced by a tension reducing device.

According to a ninth aspect of the present invention, in the method of manufacturing a self-support optical cable according to the eighth aspect of the invention, the tension of the cable body which exceedingly increases in a path line from the optical cable body feeding machine to the extruder is reduced by a tension reducing device before it enters into the extruder. The tension of the optical cable body is increased in a path line from a support wire feeding machine to the extruder.

the tension of the optical cable body is increased in a path line from a support wire feeding machine to the extruder.

According to a tenth aspect of the present invention, in the method of manufacturing a self-support optical cable according to the eighth or ninth aspect of the invention, the tension of the optical cable body in the path line is measured to control said tension reducing device.

According to an eleventh aspect of the present invention, in the method of manufacturing a self-support optical cable according to any one of the eighth to the tenth aspect of the invention, a force applied to said tension reducing device is measured.

According to a twelfth aspects of the present invention, in the method of manufacturing a self-support optical cable according to any one of the eighth to the eleventh aspects of the invention, the tension of said optical cable body downstream from said tension reducing device is more than 0 kg.

According to the first to third aspect of the present invention, a self-support optical cable to which a common sheath is applied and in which the sheath is softened is wound and cooled around guide wheels not in one direction but in two directions. Accordingly, there is an effect to be able to prevent a neck portion of the common sheath from bending on either side. In addition, according to the fourth aspect of the present invention, it is possible to prevent the neck portion of the common sheath from being wrinkled even immediately after the common sheath is coated. Accordingly, the appearance of the sheath never deteriorates.

According to the fifth to the seventh aspects of the present invention, the tension applying device is used to apply the tension to the support wire, the length measuring device is used to measure the running length of the support wire and the optical cable body so as to calculate the excess length, and the excess length is controlled based on the tension of the support wire. Therefore, it is made easier to adjust the surplus and it is possible to give an exact excess length.

According to the eighth to the twelfth aspect of the present invention, the tension reducing device which reduces the tension of the optical cable body at the inlet portion of the extruder is used, and the tension reducing device is controlled by detecting the tension of the path line. Therefore, it is possible to apply a stable tension and to prevent the flatness of the sheath.

BRIEF DESCRIPTION OF THE DRAWINGS

In the accompanying drawings:

FIGS. 8A and 8B are explanatory views of an example of a tension reducing device;

FIG. 9 is an explanatory view of a method of detecting a force applied to the tension reducing device;

FIG. 10 is an explanatory view of a self-support optical cable to which a metal tape is longitudinally attached;

FIG. 13 is an explanatory view of a conventional self-support optical cable;

FIGS. 14A to 14C are sectional views of a shape of a self-support optical cable manufactured in a conventional manufacturing method; and FIGS. 15A to 15C are sectional views of a shape of a self-support optical cable manufactured in a conventional manufacturing method.

PREFERRED EMBODIMENTS OF THE INVENTION

Preferred embodiments according to the present invention will be described with reference to the accompanying drawings.

Figure 1:
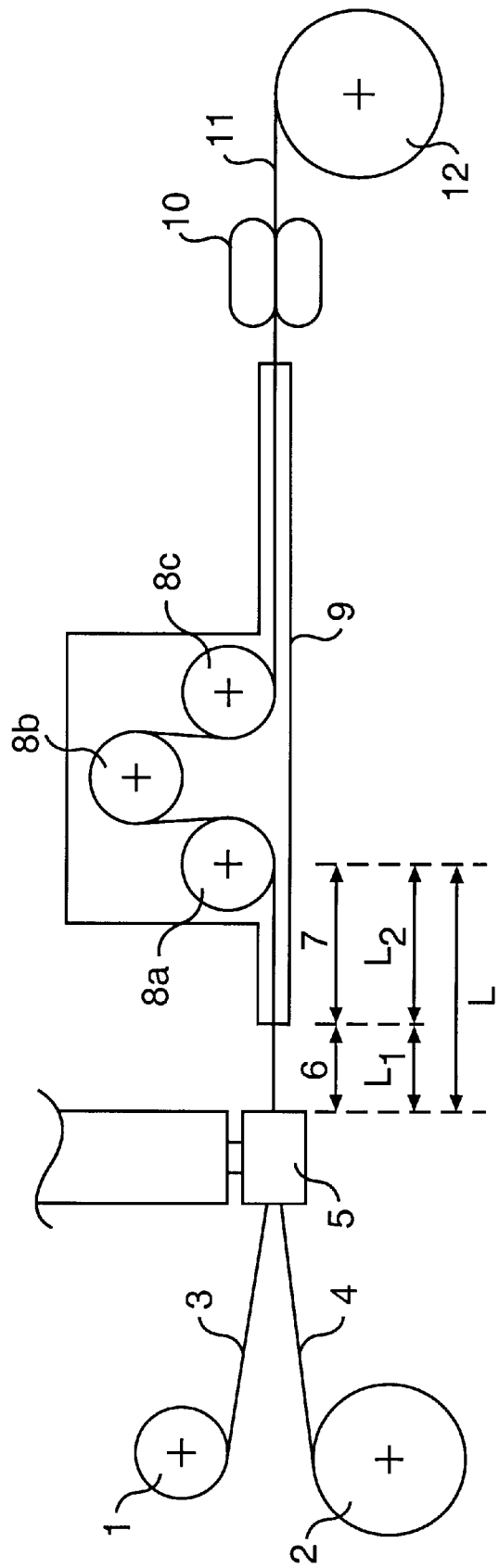
FIG. 1 is a schematic diagram of a manufacturing line for explaining an embodiment of a method of manufacturing a self-support optical cable according to the present invention.

FIG. 1 is a schematic diagram of a manufacturing line for explaining an embodiment of the method of manufacturing a self-support optical cable according to the present invention. In FIG. 1, the reference numeral 1 represents a support wire feeding machine; 2, an optical cable feeding machine; 3, a support wire; 4, an optical cable body; 5, an extruder; 6, an air-cooling zone; 7, a water-cooling zone; 8a, 8b and 8c, guide wheels; 9, a cooling water tank; 10, a pulling machine; 11, a self-support optical cable; and 12, a wind-up machine.

As the support wire 3 and the optical cable body 4, various ones which are well known can be used. For example, stranded steel wire may be used as the support wire 3. As the optical cable body 4, for example, it is possible to use an optical cable body in which a grooved spacer having one or a plurality of SZ-stranded grooves formed in its outer circumference is used, one or more single-core optical fiber or ribbon optical fiber cables are received in the groove/grooves, and a pressing winding or the like is applied to the outer circumferential surface of the spacer.

Figure 12:
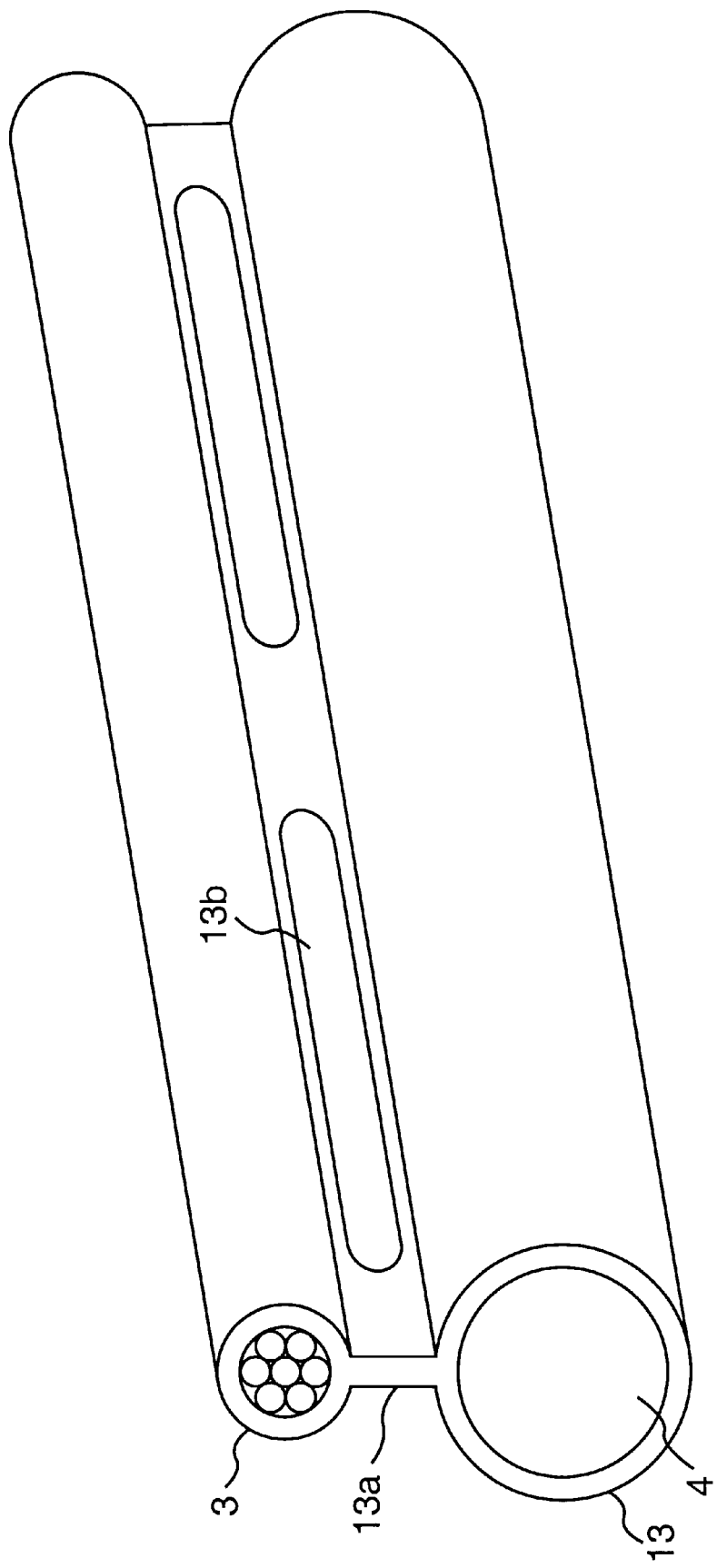
FIG. 12 is an explanatory view of a conventional self-support optical cable.

The support wire 3 and the optical cable body portion 4 fed respectively from the support wire feeding machine 1 and the optical cable body feeding machine 2 are fed into the extruder 5 having a cross head, so that the support wire 3 and the optical cable body 4 are collectively coated with a coating material, that is, thermoplastic resin, to form a self-support optical cable with a common sheath 13 formed into an eight figure shape, as shown in FIG. 12. Slits 13b are formed intermittently in a neck portion 13a of the common sheath.

After being extruded, the collectively coated eight figure self-support optical cable is passed through the air-cooling zone 6 and the water-cooling zone 7, and further cooled in the cooling water tank 9. Passing by the guide wheels 8a, 8b and 8c and the pulling machine 10 successively, the manufactured self-support optical cable 11 is wound up on a drum by the wind-up machine 12. Although the respective lengths of the air-cooling zone 6 and the water-cooling zone 7 are different in accordance with the size of the optical cable body portion 4 or the manufacturing line speed, the length $L_1$ of the air-cooling zone is variable in a range of from 200 to 2,500 mm while the length $L_2$ of the water-cooling zone 7 is variable in a range of from 500 to 2,500 mm, by way of example. In cooling the common sheath in these air-cooling zone 6 and water-cooling zone 7, the surface of the sheath is cooled to an extent that the surface of the sheath does not to adhere to guide rollers. Therefore, the sheath is not hardened perfectly to its inside, but it is still in a softened state.

The support wire 3 and the optical cable body portion 4 fed from the support wire feeding machine 1 and the optical cable body feeding machine 2 are different in their feeding speed. That is, the feeding speed of the optical cable body portion 4 is higher than the feeding speed of the support wire 3. As a result, the optical cable body portion 4 can have an excess length relative to the support wire 3.

With this excess length, the neck portion 13a (FIG. 12) of the common sheath extruded from the extruder 5 will be shifted between its support wire side and its optical cable body portion side by L×α before the neck portion 13a reaches the first guide wheel 8a.

Here, on the assumption of:

L: distance between the extruder 5 and the first guide wheel 8a

α: excess length rate the quantity of shift is 10 mm if L is 5 m and α is 0.2%, by way of example. If the quantity of shift increases, wrinkles occur in the neck portion of the common sheath, thereby deteriorating its appearance. Experimentally, it was necessary to limit the quantity of shift to 10 mm or less in order to prevent such deterioration of appearance.

Even if the quantity of shift is limited in such a manner, the resin of the common sheath is not hardened perfectly but it is still in a softened state while it passes by at least a portion of the guide wheels 8a, 8b and 8c. Therefore, there is a fear that the neck portion is deformed while the resin passes by the guide wheels.

Figure 2A:
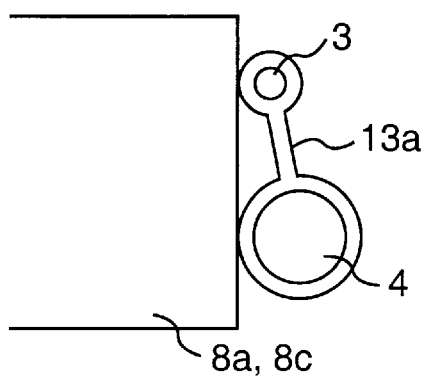
FIGS. 2A to 2F are explanatory views of shapes of guide wheels used in the present invention.
Figure 2D:
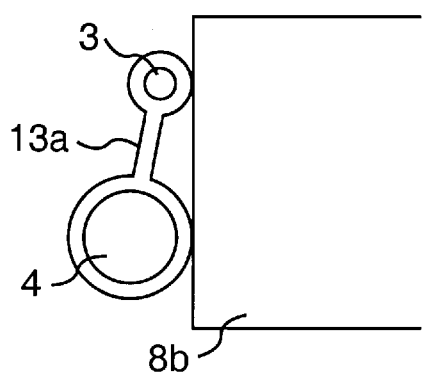
Figure 2B:
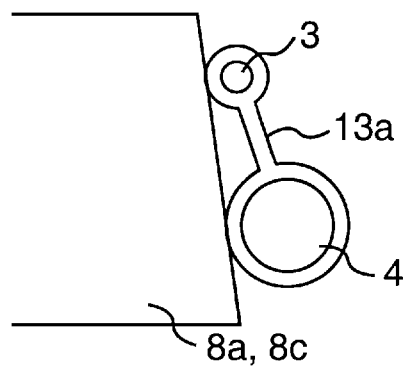
Figure 2E:
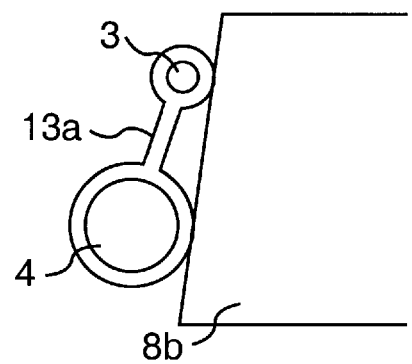
Figure 2C:
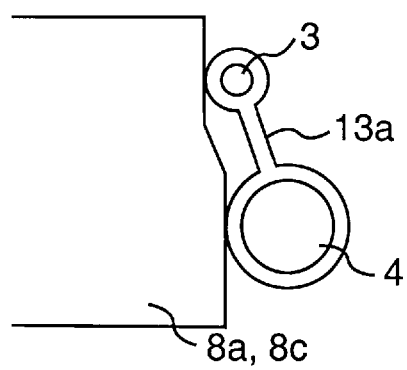
Figure 2F:
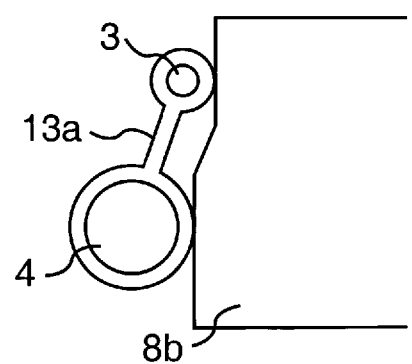

Now, the shapes of the guide wheels used in the present invention will be described in FIGS. 2A to 3E. FIGS. 2A and 2D shows a straight cylindrical shape; FIGS. 2B and 2E, a tapered cylindrical shape; and FIGS. 2C and 2F, a stepped cylindrical shape. With such shapes of the guide wheels, a portion of the sheath of the support wire and the optical cable body portion contact with the outer circumferential surface of the guide wheels, while the neck portion does not contact with the outer circumferential surface of the guide wheels. Therefore, there is a possibility to cause bending in the neck portion. However, the self-support optical cable not only passes by the guide wheels 8a, 8b and 8c described in FIG. 1 while being bent by these guide wheels, but also contacts with the guide wheel 8b on its side portion (FIGS. 2A, 2B and 2C) opposite to the side portion (FIGS. 2D, 2E and 2F) contacting with the guide wheels 8a and 8c. As a result, the bending which might be generated in the neck portion is corrected so that the shape of the neck portion can be prevented from deteriorating.

Figure 3A:
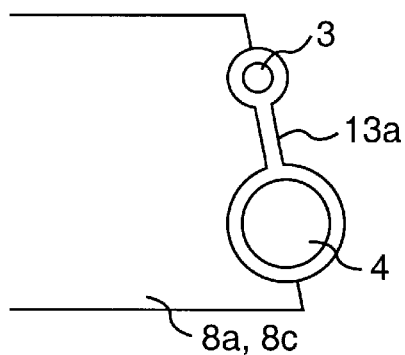
FIGS. 3A to 3E are explanatory views of other shapes of the guide wheels used in the present invention.
Figure 3B:
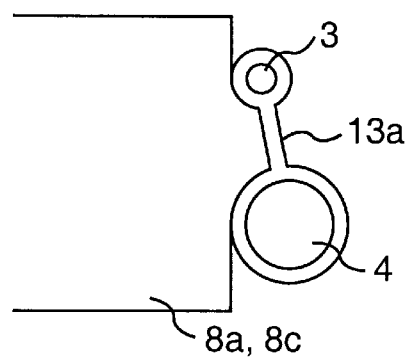

On the other hand, FIG. 3A shows a grooved shape, and FIG. 3B shows a lug shape. In either case, the neck portion also contacts with the outer circumferential surface of the guide wheels. Therefore, the function to restrict the shape of the neck portion is so large that the possibility to cause an inward bending in the neck portion is reduced. In addition, the self-support optical cable not only passes by the guide wheels 8a, 8b and 8c described in FIG. 1 while being bent by these guide wheels, but also contacts with the guide wheel 8b on its side portion opposite to the side portion contacting with the guide wheels 8a and 8c. As a result, the outward bending which might be generated in the neck portion is corrected by the opposite side guide wheel as shown in FIG. 15C, so that the shape of the neck portion can be prevented from deteriorating. Incidentally, although only the side portion of the guide wheels 8a and 8b is described, the side portion of the guide wheel 8b is reversed to FIGS. 3A to 3E as similar to FIGS. 2D, 2E and 2F.

By selecting the diameter r of the guide wheels contacting with the sheath of the support wire, and the diameter R of the guide wheels contacting with the sheath of the optical cable body portion, the shapes of the guide wheels except the straight cylindrical one described in FIG. 2A are roughly classified into three kinds of patterns as follows.

r=R r>R r<R

Figure 3C:
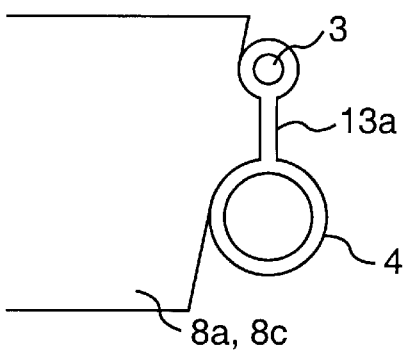
Figure 3D:
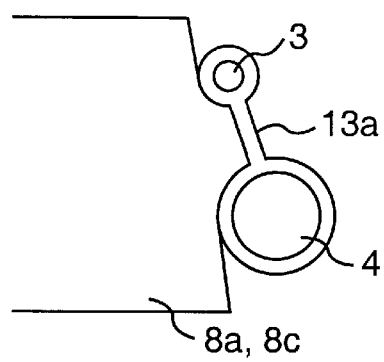
Figure 3E:
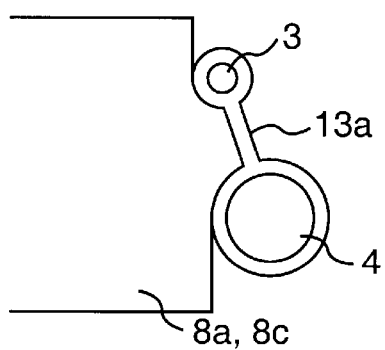

FIG. 3B shows an example of r=R, FIG. 3C shows an example of r>R, and FIG. 3D shows an example of r<R. FIG. 3E shows an example of a stepped shape with a protrusion. These relations between r and R are selected suitably to obtain the excess length.

Figure 4A:
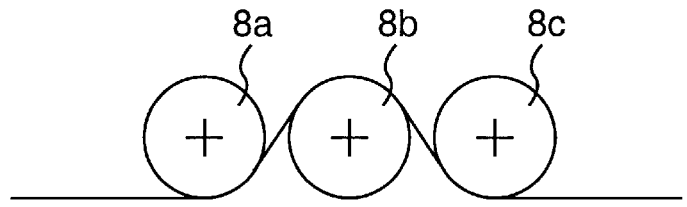
FIGS. 4A to 4D are explanatory views of an embodiment of arrangement of the guide wheels used in the present invention.
Figure 4B:
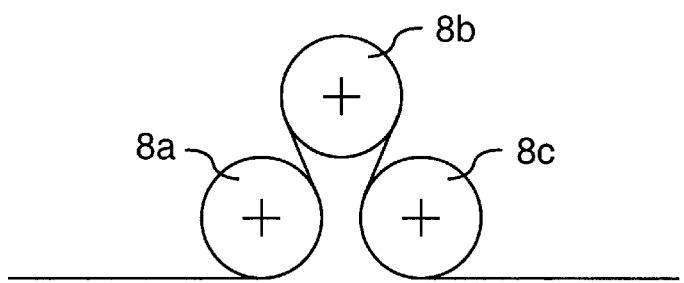
Figure 4C:
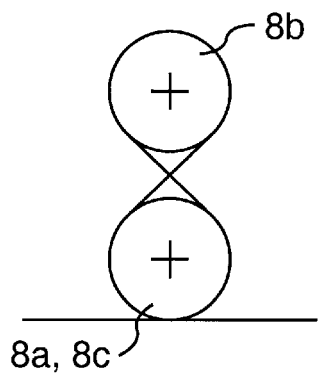
Figure 4D:
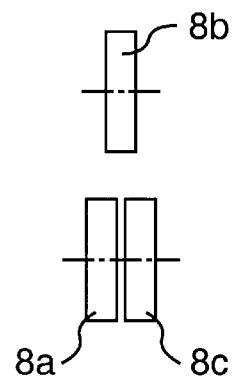

FIGS. 4A to 4D show another example of the arrangement in the case where three guide wheels as described in FIG. 1 are used. FIG. 4A shows an example in which the rotation axes of three guide wheels 8a, 8b and 8c are disposed in the same plane. The space of disposition can be reduced. In FIG. 4B, the winding angle of a self-support optical cable on the guide wheels is made larger than that in FIG. 1. As a result, the effect for shape restriction is large. The self-support optical cable in FIG. 4C enters the guide wheel 8c from the guide wheel 8a through the guide wheel 8b as in its side view shown in FIG. 4C. Either horizontal, vertical or oblique direction is applicable as the direction of the respective axes.

Although the number of guide wheels is three in these examples, it is not limited to this value. It will go well if a plurality of guide wheels are used, and the guide wheel(s) contacting with one side of a self-support optical cable and the guide wheel(s) contacting with the other side of the self-support optical cable are disposed alternately in the feeding direction. The number of the guide wheels may be two, or four or more. The shape to ensure an S-shaped path has a large winding angle onto the guide wheels, so as to obtain a large effect to restrict the shape of the sheath.

Although cooling in the guide wheel portions was performed by flowing water in the above embodiment, it is not limited to this way, and a suitable cooling method such as passing through a water pool, water shower, spraying gas, or the like may be adopted.

Figure 5:
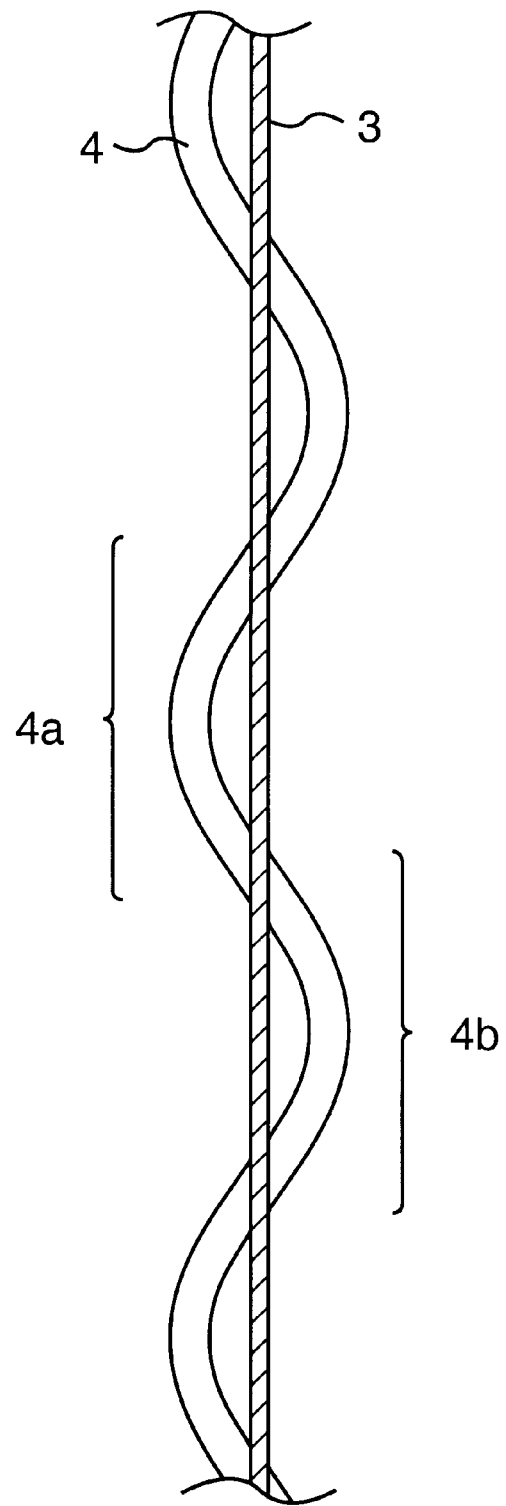
FIG. 5 is an explanatory view showing shapes of the self-support optical cable with slits and a support wire.

If the tension is not applied to the support wire of the self-support optical cable in which the optical fiber body has the excess length with respect to the supporting cable, the optical fiber cable body is meandered along the support wire. The shape of the meandering is irregular. In the self-support optical cable with silts as shown in FIG. 12, the optical cable body is connected to the support wire at predetermined intervals. Accordingly, as shown in FIG. 5, when the optical fiber body 4 is seen from just above while the support wire 3 is upper than the optical fiber body 4, the optical fiber body 4 draws a sine curve. The shape of the sine curve may not be in longitudinal direction because the bonding manners of the compositions of the optical cable do not always synchronize with the interval of the slits. Accordingly, the sine curve does not become a standard one, and the portion 4a is not always symmetrical with the portion 4b.

The excess length of the self-support optical cable produced by the plurality of guide wheels is varied depending on the conditions such as the cable outer diameter, the deformation of the cable, the deflection amount of the cable, the hardness of the optical cable body, the temperature of cooling water, and the manufacture line velocity. However, since the guide wheel is in constant, it is not possible to adjust the excess length in accordance with any conditions.

Figure 6:
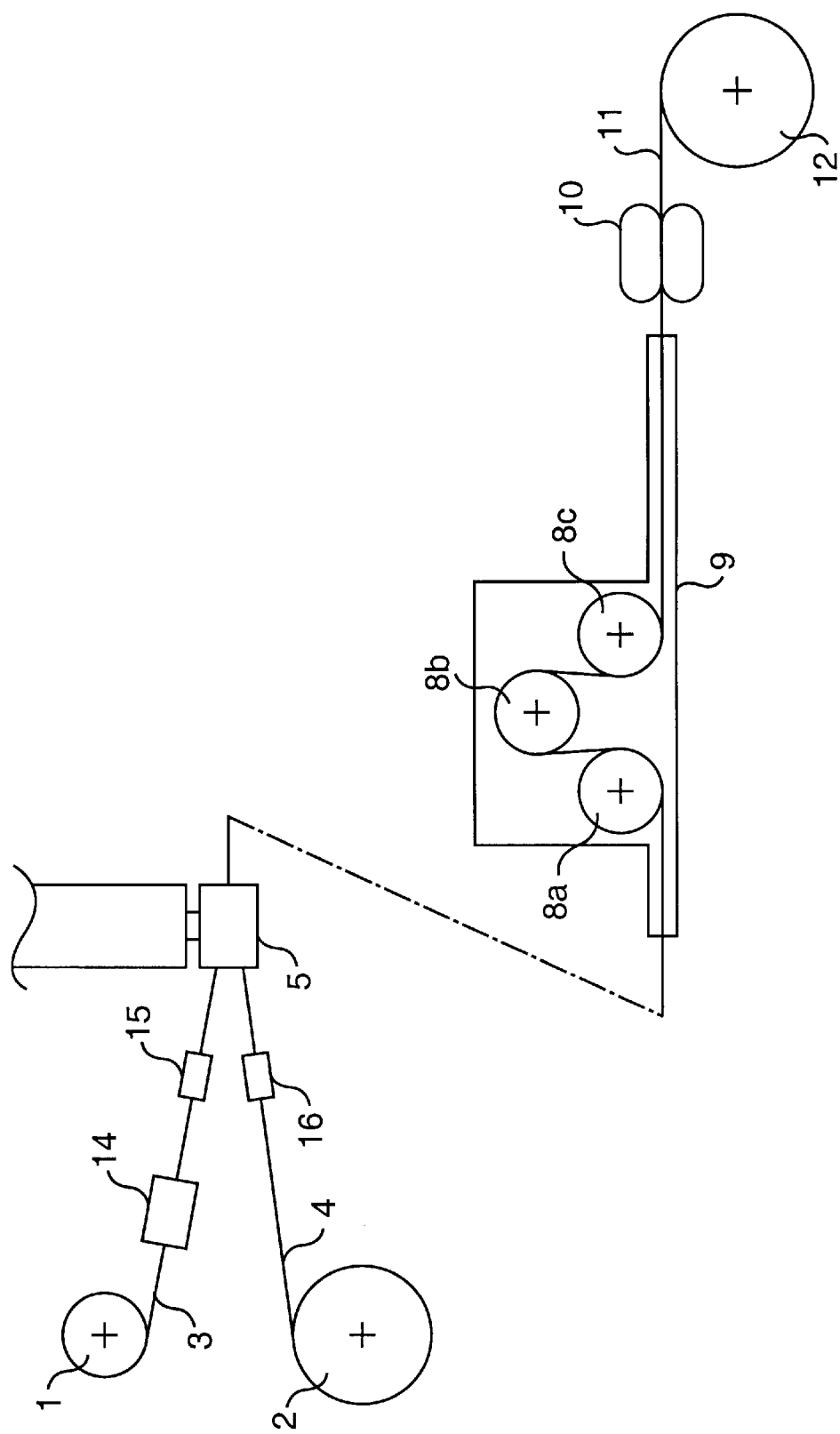
FIG. 6 is a schematic diagram of a manufacturing line for explaining a second embodiment of a method of manufacturing a self-support optical cable.

FIG. 6 is a schematic diagram of the manufacture line for explaining a second embodiment of the manufacturing method of a self-support optical cable according to the present invention. In the drawing, the same numerals are assigned to the portions same as those in FIG. 1, and their explanations are omitted here. Reference numeral 14 represents a tension applying device; and 15, 16, length measuring devices. In this embodiment, a manufacture line can adjust the excess length, and measure the excess length.

The optical cable body 4 is fed from the cable feeding machine 2 to the extruder 5, and its moving length is measured before the extruder 5 by the length measuring device 16. On the other hand, the support wire 3 is fed from the support wire feeding machine 1 to the extruder 5 through the tension applying device 14 while the moving length is measured by the length measuring device 15. The self-support optical cable 11 integrated by the extruder 5 passes through the guide wheels 8a, 8b, 8c, thereby the excess length being generated and is pulled up by the pulling machine 10, and is wound by the wind-up machine 12. The tension is applied to the support wire 3 between the tension applying device 14 and the pulling machine 10. For example, the tension is about 200 Kg.

The tension applying device 14 adds a tension to the support wire by a holder for suppressing a feeding speed thereof. As for the holder, there are two types, namely, one which gives a friction force against the feeding direction and one which gives an actuating force against the feeding of the support wire.

The excess length of the optical cable body generated by the guide wheels 8a, 8b, 8c on this manufacturing line is varied according to the extent of the extension of the support wire 3 which is caused by a tension applied thereto.

Accordingly, it is possible to determine the excess length by setting the tension applied to the supporting wire 3. In addition, if the excess length shifts from the set value, the excess length can be adjusted to a desired length by adjusting the tension applying device 14.

It is possible to calculate the excess length based on the outputs of the length measuring device 15 which measures the running length of the support wire 3 and the length measuring device 16 which measures that of the optical cable body 4. Alternatively, the calculation result may be fed-back to the tension applying device 14 so as to control the excess length. Incidentally, the measuring device 15 for measuring the supporting wire 3 may amend the expansion based on the tension set in the tension applying device 14.

In one example, where the variation of the excess length obtained by the guide wheels 8a, 8b, 8c was ±0.06% with respect to a target value when a tension of 200 kg was applied to the support wire by the tension applying device 14 and the excess length calculated by the output of the length measuring devices 15, 16 shifted +0.025% from the center of the set value, the excess length was made to come to the center of the set value by changing the length of the support wire by decreasing the tension of the support wire by 100 kg. Thus, it is possible to suppress the variation of the excess length within a range of less than ±0.05%.

In case of controlling the tension based on the calculation result of the excess length, in order to prevent excess tension variation, it is preferable to obtain the average value of the excess length. In order to obtain the average value, the length measured by the length measuring device 15 or 16 is preferably from 5 to 50 m. It is preferable that the average excess length is calculated from the measured value of the length.

In this embodiment, since the tension is applied to the support wire 3, there is an advantage that the self-support optical cable can be manufactured without giving the pressure to the optical cable body 4 in which optical fibers are received.

Figure 7:
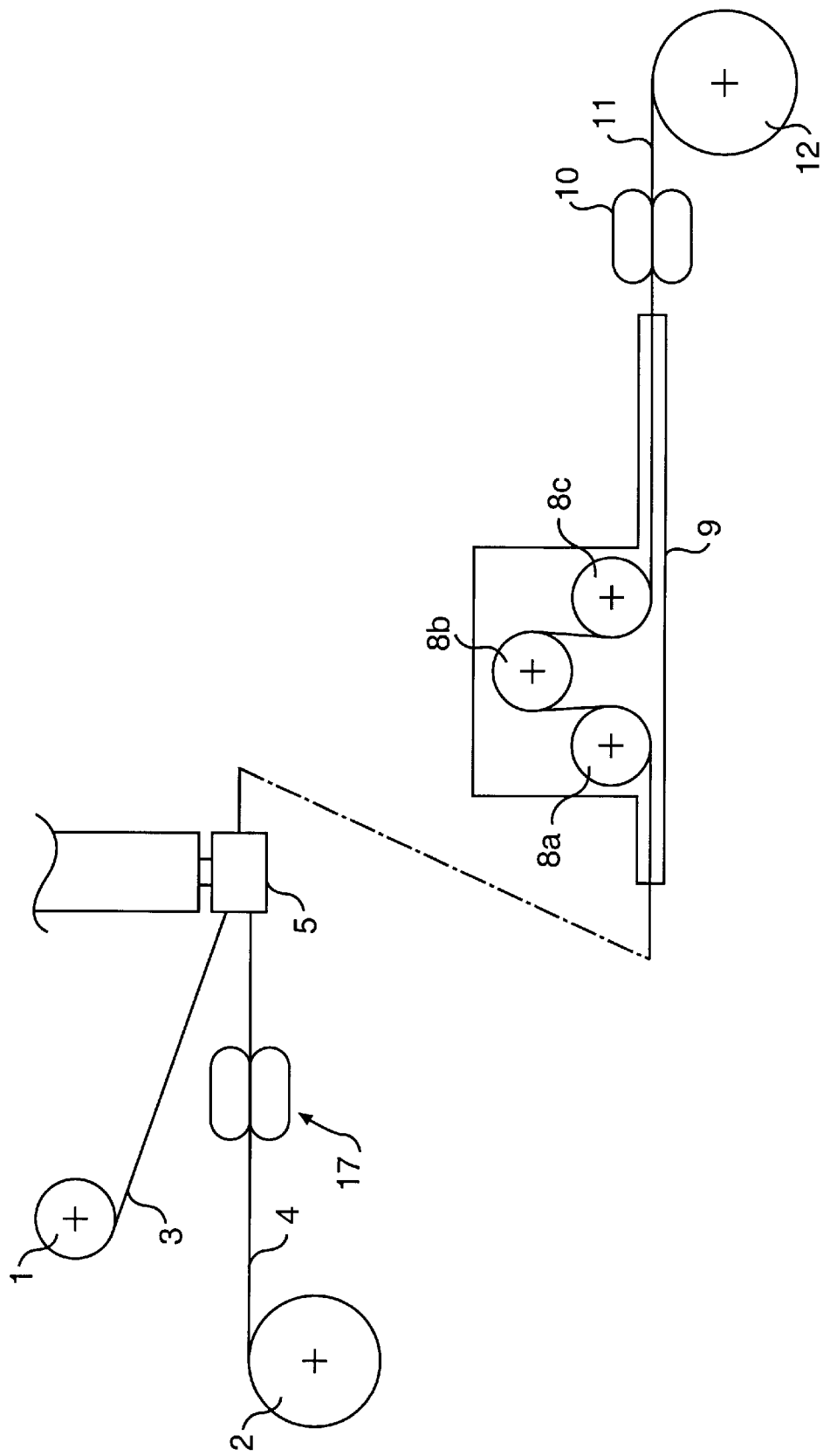
FIG. 7 is a schematic diagram of a manufacturing line for explaining a third embodiment of a method of manufacturing a self-support optical cable.

FIG. 7 is a schematic diagram of a manufacturing line for explaining a third embodiment of a manufacturing method of the self-support optical cable according to the present invention. In the drawing, the same numerals are assigned to the portions same as those in FIG. 1, and their explanations are omitted here. Reference numeral 17 represents a tension reducing device.

If the supplying drum of the optical cable body feeding machine 2 which feeds the optical cable body 4 is large, a large tension for pulling the optical cable body 4 is needed and the tension when it passes though the guide wheels 8a, 8b, 8c also becomes large. Accordingly, the optical cable body 4 is expanded and it is not possible to obtain a predetermined excess length. In addition, if the tension of the optical cable body is larger than the friction force between the optical cable and the guide wheels 8a, 8b, 8c, a slip of the optical cable body occurs at the guide wheels 8a, 8b, 8c. As a result, it is not possible to obtain a predetermined excess length. Further, if excessive tension is applied to the optical cable body 4, a sheath around the optical cable body 4 may be deformed to be flat.

There is a method to manufacture the self-support optical cable in which a metal tape such as aluminum or stainless is attached longitudinally on the optical cable body, the metal tape is cylindrically formed, and a common sheath is applied thereon. In this method, since the optical cable body 4 is subjected to the tension generated at the time of forming the metal tape attached thereto, the tension of the optical cable body increases. Consequently, the tension of the optical cable body at the time of passing through the guide wheels 8a, 8b, 8c increases, thereby not only the excess length can not be obtained in a predetermined length, but also the flattening of the sheath increases.

In the following embodiment, the tension of the optical cable body can be reduced, and it is possible to obtain a stable excess length and to suppress the flatness of the sheath.

In the manufacturing line, although the optical cable body 4 is fed from the cable feeding machine 2 to the extruder 5, the tension for feeding the optical fiber body to the extruder 5 is reduced by the tension reducing device 17 before the extruder 5. On the other hand, the support wire 3 is fed from the support wire feeding machine 1 to the extruder 5. The self-support optical cable 11 integrated by the extruder 5 is given the excess length by passing through the guide wheels 8a, 8b, 8c, is drawn up by the pulling machine 10, and is wound by the wind-up machine 12. In the manufacturing line, if the self-support optical cable 11 is the self-support optical cable with slits, slits are formed intermittently at the neck portion of the common sheath. The tension of the optical cable body 4 from the feeding machine 2 is reduced through the tension reducing machine 17 so as to obtain a predetermined excess length and prevent the flattening of the sheath.

Description will be given regarding to the tension reducing device 17 employed in this embodiment. FIGS. 8A and 8B are views for explaining one example of the tension reducing device 17. FIG. 8A is a side view, and FIG. 8B is a plane view but a pressure belt is shown in its section. In the drawing, reference numeral 4 represents the optical cable body; 21a, 21b, pressure belts; 22a, 22b, pulleys; 23, an actuating source; and 24, a transmission mechanism.

The optical cable body 4 is put between the upper and bottom pressure belts 21a, 21b. The pulleys 22a, 22b actuating the pressure belt 21a, 21b is actuated by the actuating source 23 capable of changing torque through the transmission mechanism. As the transmission mechanism 24, an appropriate power transmission mechanism such as a belt mechanism and a gear mechanism can be used. By adjusting the output torque of the actuating source 23, the tension F2 fed to the extruder (FIG. 5) can be reduced in accordance with the output torque of the actuating source 23 against the tension F1 from the feeding machine 2 (FIG. 7). For example, F1 is 20 kg to 100 kg, which can reduce F2 to 5 kg to 20 kg. Here, the tension reducing device 17 only reduces the tension of the optical cable body 4, but the velocity of the cable is not changed. Incidentally, as an example of the tension reducing device 17, the pressure belt method has been explained. However, the object is to reduce the tension, and the method is not limited to the pressure belt method. Any appropriate available methods, such as winding the optical cable body 4 around a wheel having an actuating source capable of changing the winding torque, may be used.

FIG. 9 is a view for explaining an example of a method for detecting a force applied to the tension reducing device. In the drawing, reference numeral 4 represents the optical cable body; 17, the tension reducing device; 25, a slide table; 26, a slide guide shaft; 27, a weight detecting sensor; and 28, a frame. The tension reducing device 17 is a mechanism for detecting a force opposite to the forward direction of the optical cable body 4. The tension reducing device 17 is installed on the slide table 25 which is disposed to be freely movable in the path line direction on the slide guide shaft 26. The weight detecting sensor 27 is disposed on the frame 28, which detects a force opposite to the forward direction of the optical cable body 4. Simply, the weight detecting sensor 27 can detect can the difference (F1−F2) which is the difference between the tension of the optical cable body 4 at the inlet side of the tension reducing device 17 and that of the optical cable body 4 at the outlet side of the tension reducing device 17, thereby detecting the reduced amount of the tension by the tension reducing device 17. Accordingly, if the tension F1 at the inlet side is known, a proper tension F2 can be obtained by adjusting the torque of the tension reducing device 17, whereby a stable excess length can be obtained.

If the reduced tension by the tension reducing device 17 is excessive, the difference (F1−F2) becomes less than 0 kg. In this situation, since the tension is not given at the extruder 5 and the guide wheels 8a, 8b, 8c, it is not possible to take an exact excess length. Accordingly, the tension of the optical cable body 4 at the outlet of the tension reducing device 17 should be set not less than 0 kg.

Figure 11:
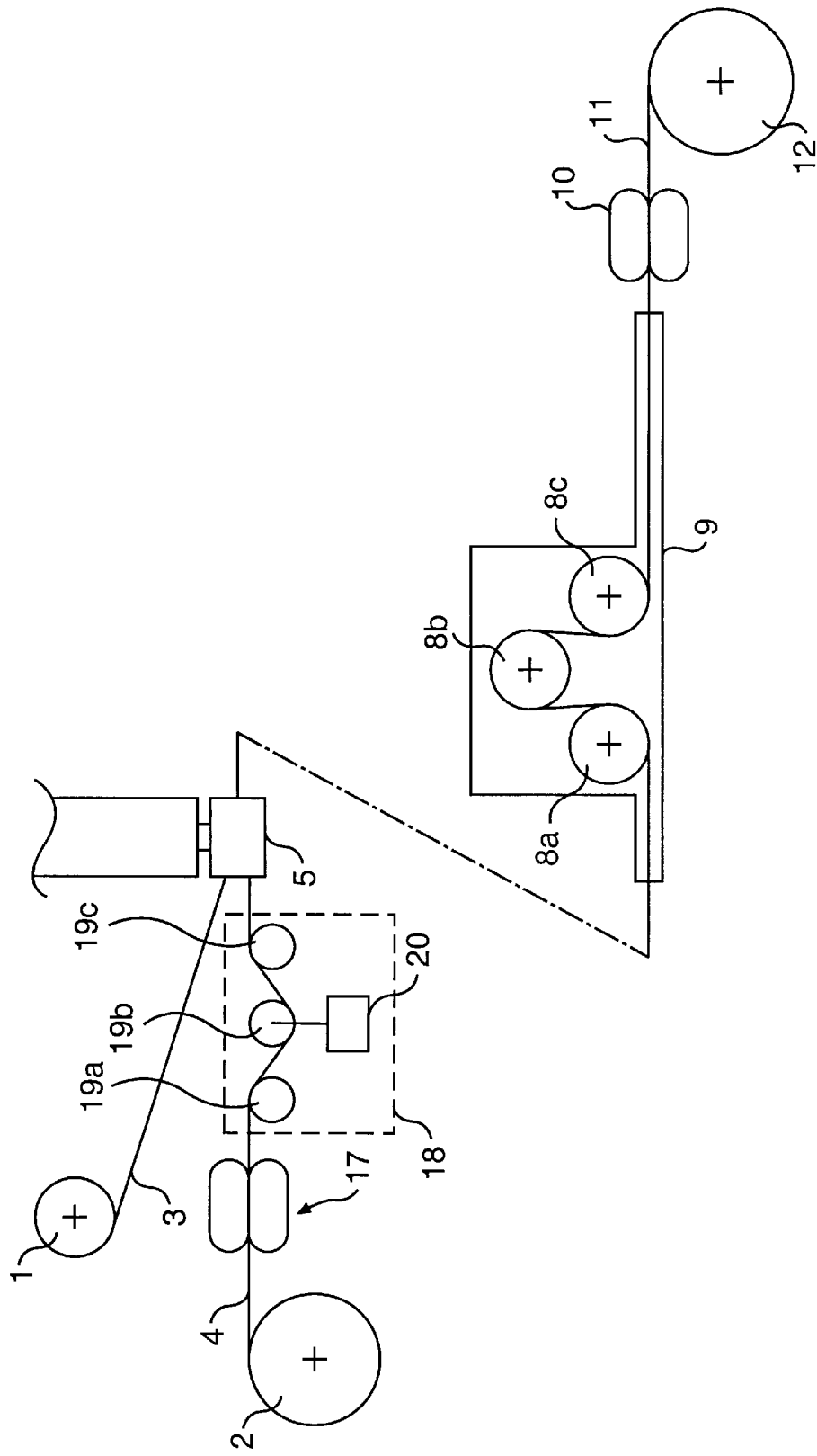
FIG. 11 is an schematic diagram of a manufacturing line of explaining a fourth embodiment of a method of manufacturing a self-support optical cable.

FIG. 11 is a schematic diagram showing a fourth embodiment of a manufacturing method of the self-support optical cable according to the present invention. In the drawing, the same numerals are assigned to the portions same as those in FIG. 7, and their explanations are omitted here. In the drawing, reference numeral 18 represents a tension measuring device; 19a, 19b, 19c, guide rollers; and 20, a weight detecting sensor.

Even if the tension applied to the optical cable body 4 is not high, if the tension of the optical cable body 4 is changed at the inlet portion of the guide wheel, the contact condition of the guide wheel and the optical cable body 4 is changed and the deviation of the fed length of the optical cable body 4 is generated. In addition, because the tension is applied to the optical cable body 4, the optical cable body 4 itself is expanded. Although the expansion amount of the optical cable body 4 depends on its size, a small-diameter cable is expanded about 0.06% at the tension of 20 kg. The optical cable body 4 passes through the guide wheels 8a, 8b, 8c while being expanded, and the length of the optical cable body 4 returns to the original length when the tension of the path line is released. Accordingly, the excess length is made less than the set value. Therefore, if the tension of the optical cable body 4 is changed, the expansion amount of the optical cable body 4 itself is changed and it becomes a cause of the deviation of the excess length.

In the following embodiment, the tension of the optical cable body 4 at the path line is measured so as to provide a stable excess length.

In the manufacturing line, the optical cable body 4 is fed from the cable feeding machine 2 to the extruder 5 through the tension reducing device 17 while the tension of the optical cable body 4 at the path line is measured by the tension measuring device 18 provided before the extruder 5. On the other hand, the support wire 3 is fed from the support wire feeding machine 1 to the extruder 5. The self-support optical cable 11 integrated by the extruder 5 is given an excess length by passing through the guide wheels 8a, 8b, 8c, is drawn up by the pulling machine 10, and is wound by the wind-up machine 12. In the manufacturing line, if the self-support optical cable 11 is the self-support optical cable with slits, slits are formed intermittently at the neck portion of the common sheath.

As a specific example of the tension measuring device 18 for measuring the tension of the optical cable body 4 that is has been reduced by the tension reducing device 17, the tension can be measured in such a manner that the optical cable body 4 passes above the guide rollers 19a, 19b, 19c and therebetween the weight detection sensor 20 is provided on the guide roller 19b pulling the optical cable body 4 downward. The tension reducing device 17 is controlled based on the measuring data so that it is possible to stabilize the tension of the optical cable body 4, and as a result, a stable excess length can be obtained.

As shown in FIG. 10, there is a self-support optical cable in which a metal tape 29 made of such a material as aluminum and stainless is attached on the optical cable body 4 and it is shaped cylindrically, and then, it is covered with a common sheath 13. In this manufacturing line of the self-support optical cable, since the optical cable body 4 receives the tape forming tension, the tension at the inlet portion of the extruder 5 is increased. Even in this manufacturing line, the tension reducing device 17 effectively functions, and even if the tension of the optical cable body 4 is high, a desirable excess length can be obtained and the flatness of the sheath is not generated. Further, the tension measuring device 18 is provided and its measurement result is fed-back to the tension reducing device. Accordingly, it is possible to suppress the change of the tension of the optical cable body 4 at the inlet portion of the extruder 5, thereby obtaining a stable excess length.

What is claimed is:

1. A method of manufacturing a self-supporting optical cable, comprising the steps of:

feeding a support wire and an optical cable body arranged in parallel with each other to an extruder;

extruding a sheath, in a figure eight shape, over both said support wire and said optical cable body to form said self-supporting optical cable;

partially cooling said sheath to a temperature greater than that needed to harden said sheath; and passing said self-supporting optical cable, before said sheath hardens, over a plurality of guide wheels to give a length to said optical cable body in excess of that given to said support wire, wherein said guide wheels, being disposed in a cooling water tank, first contact one side of said self-supporting optical cable and then contact the other side of said self-supporting cable, the guide wheels being disposed alternately in a feed-out direction.

2. A method of manufacturing a self-supporting optical cable according to claim 1, wherein each of said guide wheels has an outer circumferential surface shaped as a straight cylinder, a tapered cylinder, or a stepped cylinder.

3. A method of manufacturing a self-supporting optical cable according to claim 1, wherein each of said guide wheels has an outer circumferential surface shaped as a grooved or lug cylinder.

4. A method of manufacturing a self-supporting optical cable according to claim 1, wherein said wheels are disposed so that the product of a distance between a first contact point of said guide wheels and an outlet of said extruder multiplied by a rate of the excess length is about 10 mm or less.

5. A method of manufacturing a self-supporting optical cable, comprising the steps of:

feeding a support wire and an optical cable body arranged in parallel with each other to an extruder;

extruding a sheath, in a figure eight shape, over both said support wire and said optical cable body to form said self-supporting optical cable;

partially cooling said sheath to a temperature greater than that needed to harden said sheath; and passing said self-supporting optical cable, before said sheath hardens, over a plurality of guide wheels to give a length to said optical cable body in excess of that given to said support wire; and controlling said excess length by a tension on said support wire.

6. A method of manufacturing a self-supporting optical cable according to claim 5, further comprising the steps of continuously measuring said excess length to generate a measurement result; and controlling said excess length by controlling the tension on said support wire based on said measurement result.

7. A method of manufacturing a self-supporting optical cable according to claim 6, wherein said measurement result is about 5 m or more.

8. A method of manufacturing a self-supporting optical cable, comprising the steps of:

feeding a support wire and an optical cable body arranged in parallel with each other to an extruder;

extruding a sheath, in a figure eight shape, over both said support wire and said optical cable body to form said self-supporting optical cable;

partially cooling said sheath to a temperature greater than that needed to harden said sheath;

passing said self-supporting cable through a plurality of guide wheels to give a length to said optical cable body in excess of that given to said support wire; and reducing a tension on said optical cable body at said extruder's inlet position with a tension reducing device.

9. A method of manufacturing a self-supporting optical cable according to claim 8, further comprising the step of reducing a tension on said optical cable body by a tension reducing device before it enters into said extruder, after the feeding step but before the extruding step.

10. A method of manufacturing a self-supporting cable according to claim 8, further comprising the step of measuring a tension on said optical cable body to control said tension reducing device.

11. A method of manufacturing a self-supporting cable according to claim 8, further comprising the step of measuring a force applied to said tension reducing device.

12. A method of manufacturing a self-supporting optical cable according to claim 8, wherein said tension on said optical cable body downstream from said tension reducing device is more than about 0 kg.

13. A method of manufacturing a self-supporting optical cable according to claim 1, further comprising the step of applying a tension to said support wire by a tension applying device between said feeding step and said extrusion step, thereby increasing the tension of the support wire.

* * * * *